(12) United States Patent
Lewis et al.

(10) Patent No.: US 11,418,088 B2
(45) Date of Patent: *Aug. 16, 2022

(54) CONTROL SCHEME FOR POWER TOOL HAVING A BRUSHLESS MOTOR

(71) Applicant: Black & Decker Inc.

(72) Inventors: Joshua M. Lewis, Baltimore, MD (US); James E. Goble, Red Lion, PA (US)

(73) Assignee: Black & Decker Inc., New Britain, CT (US)

(*) Notice: Subject to any disclaimer, the term of this patent is extended or adjusted under 35 U.S.C. 154(b) by 119 days.

This patent is subject to a terminal disclaimer.

(21) Appl. No.: 16/863,259

(22) Filed: Apr. 30, 2020

(65) Prior Publication Data

US 2020/0259395 A1 Aug. 13, 2020

Related U.S. Application Data

(63) Continuation of application No. 15/630,035, filed on Jun. 22, 2017, now Pat. No. 10,680,494.

(Continued)

(51) Int. Cl.
*H02K 7/14* (2006.01)
*B24B 23/02* (2006.01)
*B25F 5/00* (2006.01)

(52) U.S. Cl.
CPC ............ *H02K 7/145* (2013.01); *B24B 23/028* (2013.01); *B25F 5/00* (2013.01); *H02P 2205/07* (2013.01)

(58) Field of Classification Search
CPC ... G06F 3/01; Y02T 10/46; H02P 6/15; H02P 6/152; H02P 25/14; H02K 7/147; B62D 5/065
See application file for complete search history.

(56) References Cited

U.S. PATENT DOCUMENTS 4,414,500 A * 11/1983 Schneider ............. H02P 25/024
318/799
6,060,850 A * 5/2000 Sakabe ................. H02P 25/145
318/434

(Continued)

FOREIGN PATENT DOCUMENTS

DE 102007027898 A1 12/2008

OTHER PUBLICATIONS

EP Communication Article 94(3) EPC dated, Apr. 6, 2021 in corresponding EP application No. 17177408.6.

*Primary Examiner* — Nathaniel C Chukwurah
(74) *Attorney, Agent, or Firm* — Amir R. Rohani

(57) ABSTRACT

A power tool is provided including a housing, an electric motor disposed within the housing, a power switch circuit disposed between a power supply and the electric motor, a main controller, and a secondary controller. The main controller is arranged to control a switching operation of the power switch circuit to regulate a speed of the motor, and is configured to monitor at least one of a speed or a rotational direction of the electric motor and deactivate the power switch circuit upon detection of fault condition associated the speed or the rotational direction of the electric motor. The secondary controller is configured to monitor at least one of the speed or the rotational direction of the electric motor independently from the main controller and deactivate the power switch circuit upon detection of fault condition associated the speed or the rotational direction of the electric motor.

11 Claims, 16 Drawing Sheets

Related U.S. Application Data

(60) Provisional application No. 62/354,361, filed on Jun. 24, 2016.

(56) References Cited

U.S. PATENT DOCUMENTS

| | | | | |
|---|---|---|---|---|
| 6,313,601 | B1* | 11/2001 | Kubo | G11B 19/28 |
| | | | | 318/603 |
| 6,518,719 | B1* | 2/2003 | Suzuki | B24B 23/02 |
| | | | | 318/430 |
| 2003/0117095 | A1* | 6/2003 | Gorti | H02P 6/085 |
| | | | | 318/275 |
| 2012/0292063 | A1* | 11/2012 | Forster | H02P 27/08 |
| | | | | 173/18 |
| 2015/0111480 | A1* | 4/2015 | Vanko | B24B 23/028 |
| | | | | 451/359 |

* cited by examiner

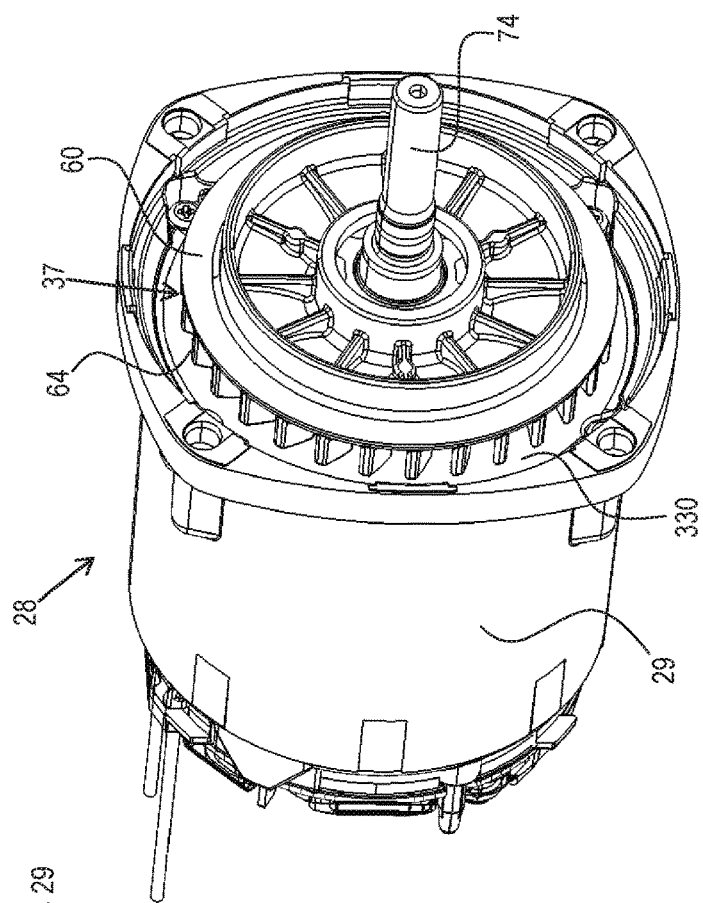
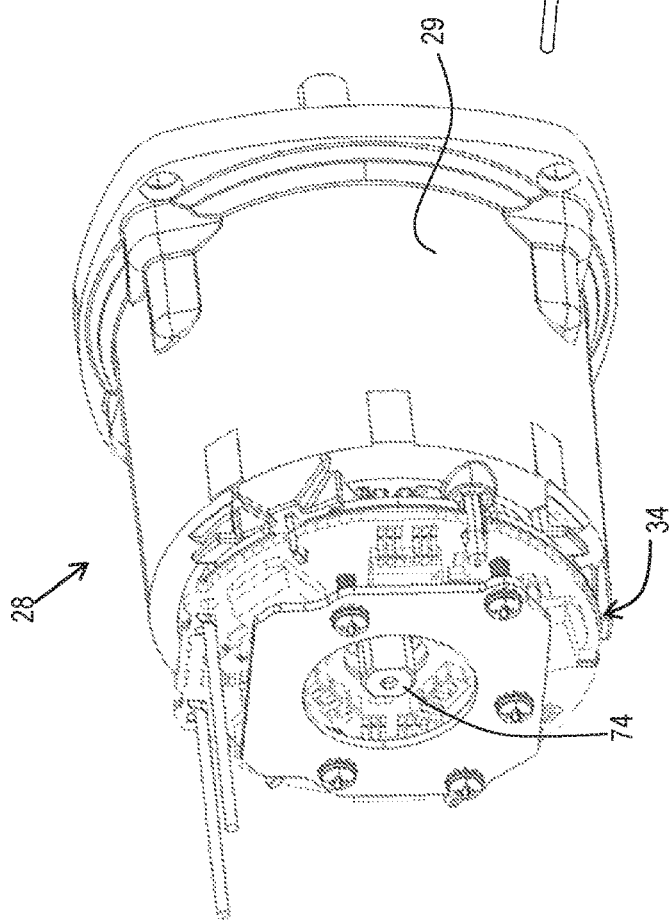
FIG. 5A
FIG. 5B

CONTROL SCHEME FOR POWER TOOL HAVING A BRUSHLESS MOTOR

RELATED APPLICATION

This application is a continuation of U.S. patent application Ser. No. 15/630,035 filed Jun. 22, 2017, now U.S. Pat. No. 10,680,494, which claims the benefit of U.S. Provisional Application No. 62/354,361 filed Jun. 24, 2016, which is incorporated herein by reference in its entirety.

FIELD

This disclosure relates to power tools, and in particularly to various methods for controlling power tools having brushless DC motors.

BACKGROUND

Cordless power tools provide many advantages to traditional corded power tools. In particular, cordless tools provide unmatched convenience and portability. An operator can use a cordless power tool anywhere and anytime, regardless of the availability of a power supply. In addition, cordless power tools provide increased safety and reliability because there is no cumbersome cord to maneuver around while working on the job, and no risk of accidently cutting a cord in a hazardous work area.

However, conventional cordless power tools still have their disadvantages. Typically, cordless power tools provide far less power as compared to their corded counterparts. Today, operators desire power tools that provide the same benefits of convenience and portability, while also providing similar performance as corded power tools.

Brushless DC (BLDC) motors have been used in recent years in various cordless power tools. BLDC motors offer many size and power output advantages over universal and permanent magnet DC motors. BLDC motors are electronically-controller via a programmable controller, and thus do not suffer from many mechanical failures associated with universal motor.

However, BLDC motors may be prone to some software failure associated with software bugs, contaminated routing and/or wiring, or a faulty micro-controller chip. What is needed is a mechanism to protect the power tool from such failures.

In addition, in cordless power tools operated via a battery pack, the over-discharge of the battery cells can permanently damage the power tool. This can occur when, for example, the tool trigger is depressed by accident for an extended period of time, causing current leakage to the various power tool components. What is needed is a mechanism that protects the battery pack from current leakage that cause the battery cells from over-discharge.

SUMMARY

According to an embodiment of the invention, a power tool is provided including a housing; an electric motor disposed within the housing; a power switch circuit disposed between a power supply and the electric motor; a main controller and a redundant controller. The main controller is arranged to control a switching operation of the power switch circuit to regulate a speed of the motor, and is configured to monitor at least one of a speed or a rotational direction of the electric motor and deactivate the power switch circuit upon detection of fault condition associated the speed or the rotational direction of the electric motor. The redundant controller is configured to monitor at least one of the speed or the rotational direction of the electric motor independently from the main controller and deactivate the power switch circuit upon detection of fault condition associated the speed or the rotational direction of the electric motor.

According to an embodiment, the power tool further includes a main solid-state switch arranged to activate a supply of power to the electric motor. In an embodiment, the power tool further includes a secondary solid-state switch activated via the main controller and coupled to a gate of the main solid-state switch. In an embodiment, the power tool further includes yet a third solid-state switch activated via the redundant controller and coupled to the gate of the main solid-state switch in series with the secondary solid-state switch.

According to an embodiment, the power tool further includes a gate driver circuit disposed between the main controller and the power switch circuit to drive the power switch circuit. In an embodiment, the main solid-state switch is arranged between the power supply and the gate driver circuit.

According to an embodiment, the power tool further includes a power supply regulator configured to produce a voltage power line for driving the gate driver circuit. In an embodiment, the main solid-state switch is arranged between the power supply regulator and the gate driver circuit.

According to an embodiment, the main solid-state switch is a P-type semiconductor switch, and the secondary solid-state switch and the third solid-state switch are disposed between a ground terminal and the gate of the main solid-state switch.

According to an embodiment, the power tool further includes a resistor disposed between a gate of the main solid-state switch and the power supply regulator to drive the gate of the main solid-state switch when at least one of the second solid-state switch or the third solid-state switch is deactivated.

According to an embodiment, the power tool includes positional sensors disposed in close proximity to the electric motor for detecting a rotational position of the electric motor. In an embodiment, the reluctant controller is configured to receive positional signals from the positional sensors and determine at least one of the speed or the rotational direction of the electric motor based on the positional signals.

According to an embodiment, the electric motor is a brushless direct-current (BLDC) motor including a rotor rotatably disposed within a stator.

According to another aspect/embodiment of the invention, a power tool is provided including a housing; an electric motor disposed within the housing; a power terminal arranged to received electric power form a power supply; an actuator supported by the housing and engageable by a user to supply electric power from the power terminal to the electric motor; a power switch circuit disposed between the power terminal and the electric motor; and a controller configured to control a switching operation of the power switch circuit to regulate power being supplied to the electric motor. A power contact switch is coupled to the actuator and disposed on a first current path from the power terminal to the power switch circuit to selectively connect the power switch circuit to the power supply. A solid-state load switch is disposed on a second current path from the power terminal to the controller, the solid-state load switch being controllable via at least one of an output of the power contact switch or a self-activating feedback signal from the controller. A solid-state override switch controllable via a self-deactivating feedback signal from the controller is provided with an output commonly coupled to the output of the power contact switch to turn off the load switch even when the power contact switch is closed.

According to an embodiment, the controller is configured to monitor a state of the power contact switch and initiate the self-deactivating feedback signal if the power contact switch is closed for a time period exceed a time threshold.

According to an embodiment, the power terminal includes a positive terminal and a negative terminal, and the power tool includes a capacitor disposed across a positive terminal and negative terminal.

According to an embodiment, a latch circuit including a first switch and a second switch, wherein the first switch is controllable via the self-deactivating feedback line and controls the second switch, and the second switch is disposed between the power contact switch and a gate of the override switch.

According to an embodiment the latch circuit is configured to keep the override switch on once the self-deactivating feedback signal is activated until the power contact switch is opened.

According to an embodiment, a power supply regulator is disposed between the power contact switch and the controller to produce a voltage from the second current path suitable for operating the controller.

According to an embodiment, a gate driver circuit is disposed between the controller and the power switch circuit to drive the power switch circuit, where the power supply regulator further produces a voltage from the second current path suitable for operating the gate driver circuit.

BRIEF DESCRIPTION OF THE DRAWINGS

The drawings described herein are for illustration purposes only and are not intended to limit the scope of this disclosure in any way.

FIGS. 5A and 5B depict perspective views of a brushless DC (BLDC) motor disposed within the power tool, according to an embodiment of the invention;

DETAILED DESCRIPTION

Figure 1:
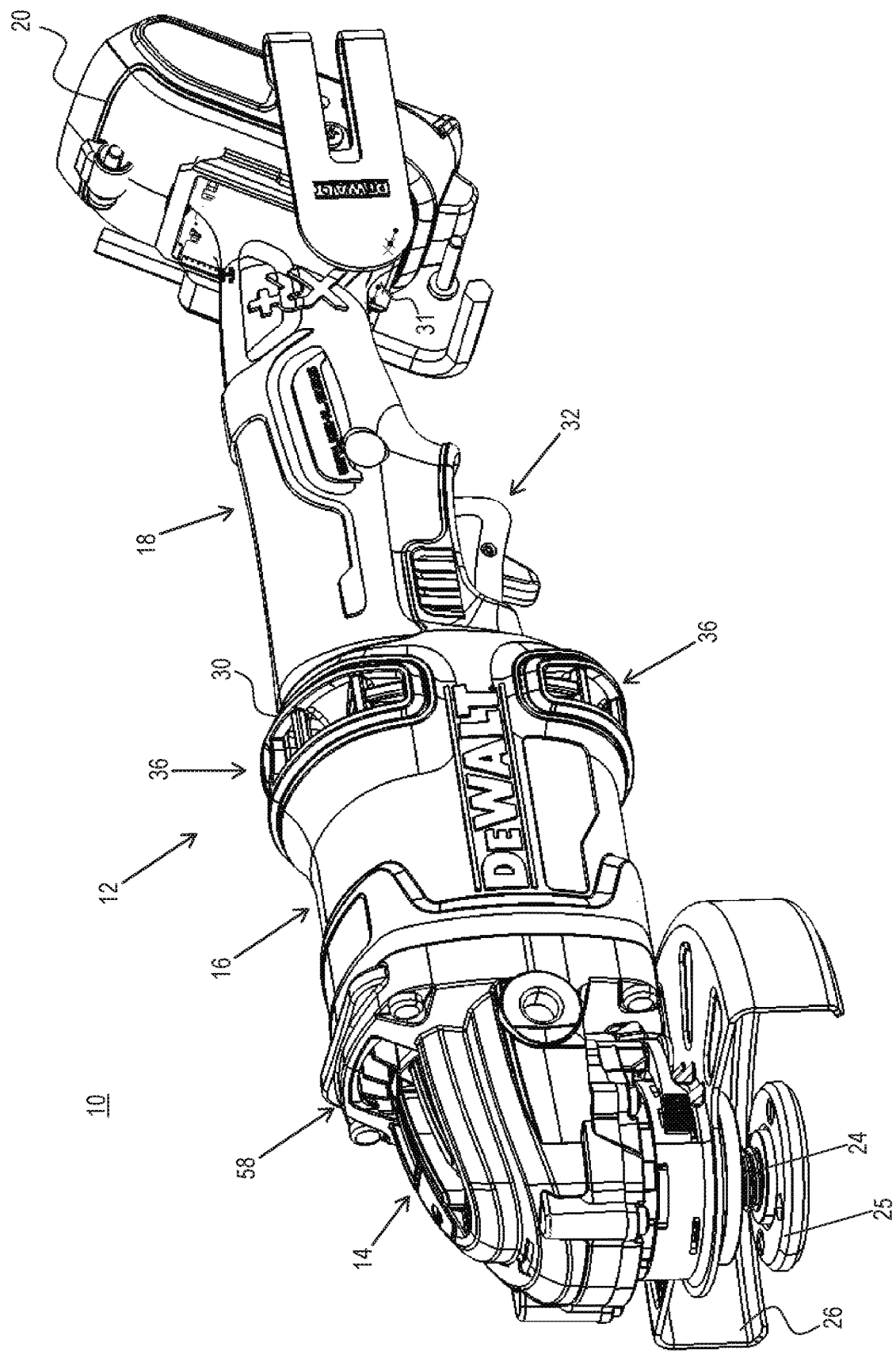
FIG. 1 depicts a perspective view of an exemplary power tool, according to an embodiment of the invention.

The following description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

Figure 2:
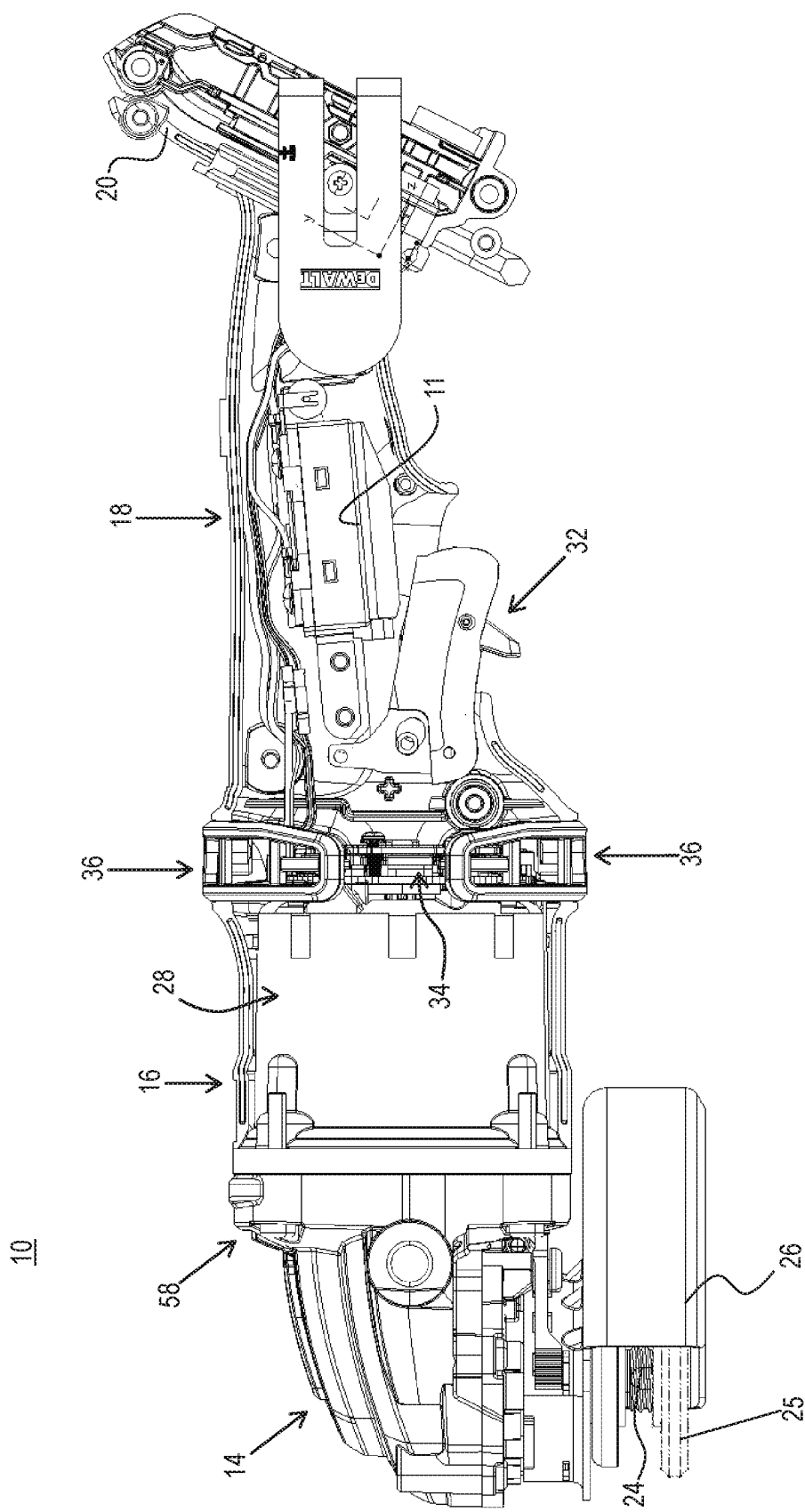
FIG. 2 depicts a size cross-sectional view of the exemplary power tool, according to an embodiment of the invention.
Figure 3:
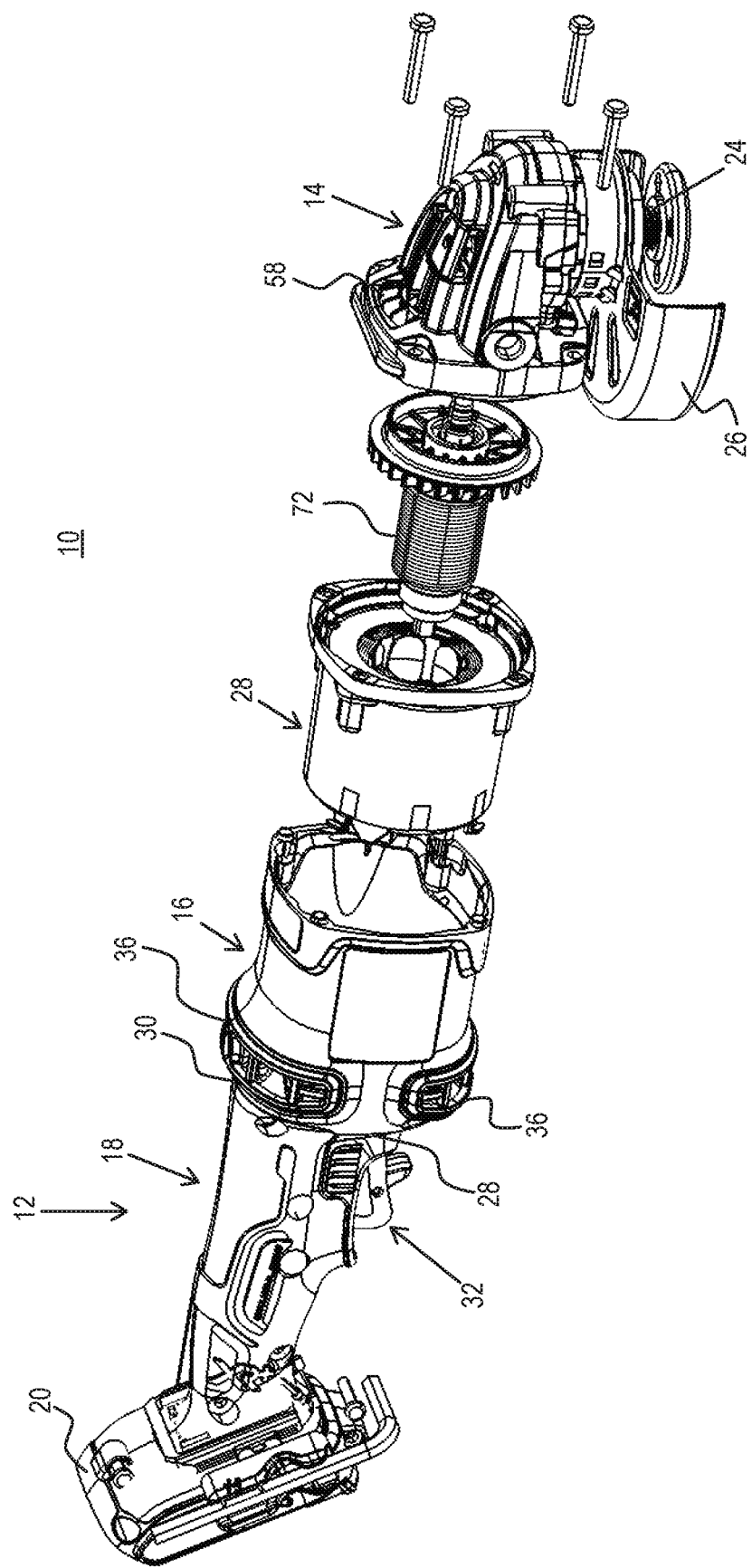
FIGS. 3 and 4 depict perspective exploded views of the exemplary power tool, according to an embodiment of the invention.
Figure 4:
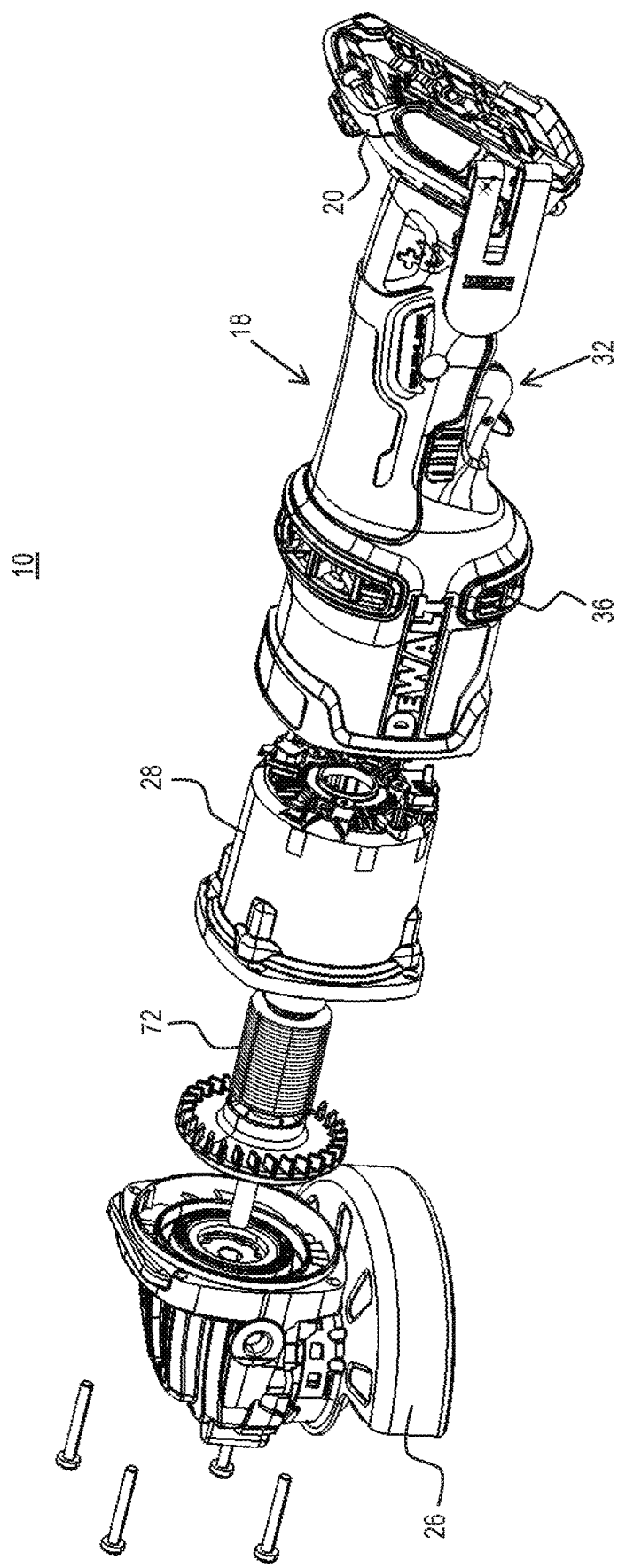

As shown in FIGS. 1-4, according to an embodiment of the invention, a power tool 10 is provided including a housing 12 having a gear case 14, a field case 16, a handle portion 18, and a battery receiver 20. FIG. 1 provides a perspective view of the tool 10. FIG. 2 provides a side view of tool 10 including its internal components. FIGS. 3 and 4 depict two exploded views of tool 10. Power tool 10 as shown herein is an angle grinder with the gear case 14 housing a gear set (not shown) that drives a spindle 24 arranged to be coupled to a grinding or cutting disc (not shown) via a flange (or threaded nut) 25 and guarded by a disc guard 26. It should be understood, however, that the teachings of this disclosure may apply to any other power tool including, but not limited to, a saw, drill, sander, and the like.

In an embodiment, the field case 16 attaches to a rear end of the gear case 14 and houses a motor 28 operatively connected to the gear set 22. The handle portion 18 attaches to a rear end 30 of the field case 16 and includes a trigger assembly 32 (also referred to as an actuator) operatively connected to a control module 11 disposed within the handle portion 18 for controlling the operation of the motor 28. The battery receiver 20 extends from a rear end 31 of the handle portion 18 for detachable engagement with a battery pack (not shown) to provide power to the motor 28. The control module 11 is electronically coupled to a power module 34 disposed substantially adjacent the motor 28. The control module 11 controls a switching operation of the power module 34 to regulate a supply of power from the battery pack to the motor 28. The control module 11 uses the input from the trigger assembly 32 to control the switching operation of the power module 34. In an exemplary embodiment, the battery pack may be a 60 volt max lithium-ion type battery pack, although battery packs with other battery chemistries, shapes, voltage levels, etc. may be used in other embodiments.

In various embodiments, the battery receiver 20 and battery pack may be a sliding pack disclosed in U.S. Pat. No. 8,573,324, hereby incorporated by reference. However, any suitable battery receiver and battery back configuration, such as a tower pack or a convertible 20V/60V battery pack as disclosed in U.S. patent application Ser. No. 14/715,258 filed May 18, 2015, also incorporated by reference, can be used. The present embodiment is disclosed as a cordless, battery-powered tool. However, in alternate embodiments power tool can be corded, AC-powered tools. For instance, in place of the battery receiver and battery pack, the power tool 10 include an AC power cord coupled to a transformer block to condition and transform the AC power for use by the components of the power tools. Power tool 10 may for example include a rectifier circuit adapted to generate a positive current waveform from the AC power line. An example of such a tool and circuit may be found in US Patent Publication No. 2015/0111480, filed Oct. 18, 2013, which is incorporated herein by reference in its entirety.

Referring to FIG. 2, the trigger assembly 32 is a switch electrically connected to the control module 11 as discussed above. The trigger assembly 32 in this embodiment is an ON/OFF trigger switch pivotally attached to the handle 18. The trigger 32 is biased away from the handle 18 to an OFF position. The operator presses the trigger 32 towards the handle to an ON position to initiate operation of the power tool 10. In various alternate embodiments, the trigger assembly 32 can be a variable speed trigger switch allowing the operator to control the speed of the motor 28 at no-load, similar to variable-speed switch assembly disclosed in U.S. Pat. No. 8,573,324, hereby incorporated by reference. However, any suitable input means can be used including, but not limited to a touch sensor, a capacitive sensor, or a speed dial.

In an embodiment, power tool 10 described herein is high-power power tool configured to receive a 60V max battery pack or a 60V/20V convertible battery pack configured in its 60V high-voltage-rated state. The motor 28 is accordingly configured for a high-power application with a stator stack length of approximately 30 mm. Additionally, as later described in detail, the power module 34, including its associated heat sink, is located within the field case 16 in the vicinity of the motor 28.

While embodiments depicted herein relate to a DC-powered power tool powered by a battery pack, it is noted that the teachings of this disclosure also apply to an AC-powered tool, or an AC/DC power tool as disclosed in WO2015/179318 filed May 18, 2015, which is incorporated herein by reference in its entirety.

Figure 6:
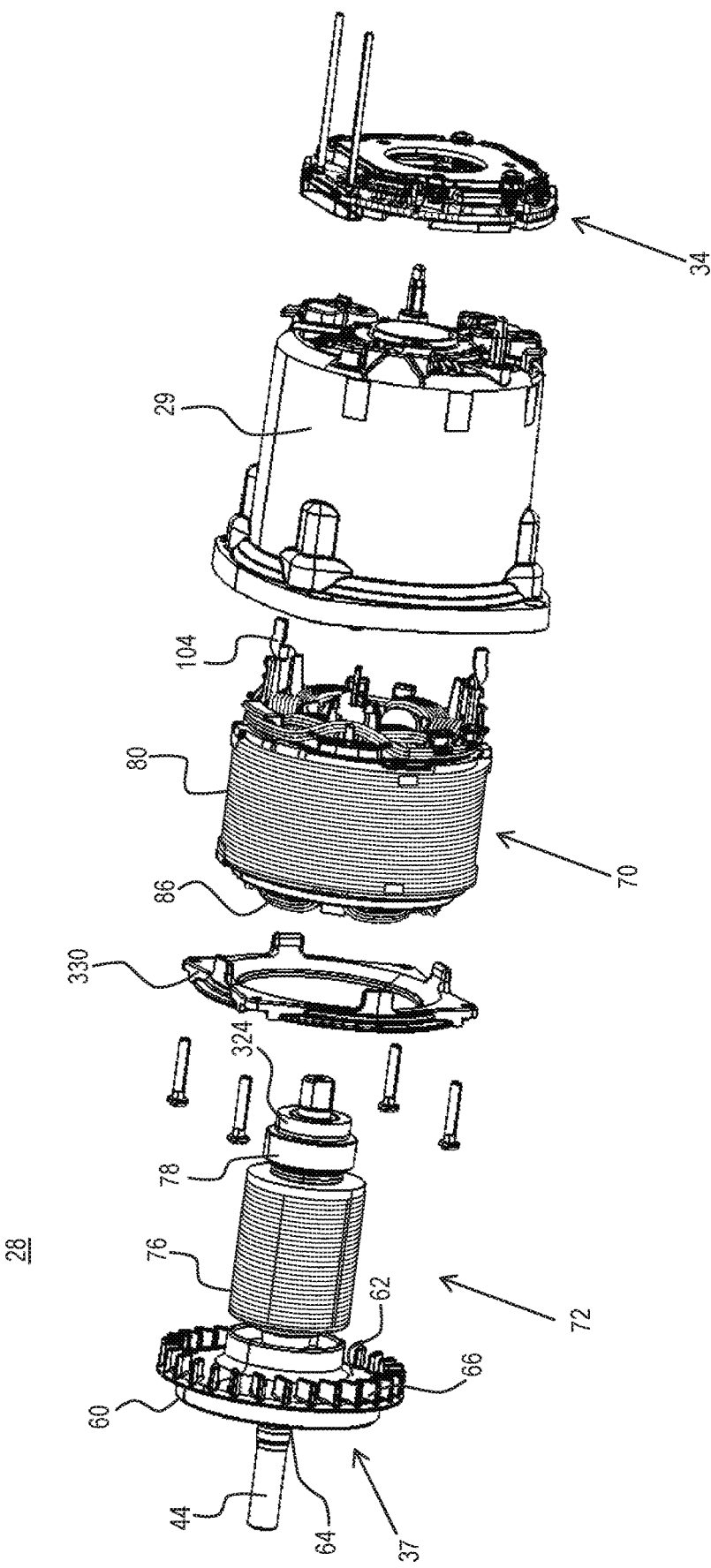
FIG. 6 depicts an exploded view of the BLDC motor, according to an embodiment of the invention.

FIGS. 5A and 5B depict two perspective views of motor 28, according to an embodiment. FIG. 6 depicts an exploded view of the motor 28, according to an embodiment. As shown in these figures, the motor 28 is a three-phase brushless DC (BLDC) motor having a can or motor housing 29 sized to receive a stator assembly 70 and a rotor assembly 72. Various aspects and features of the motor 28 are described herein in detail. It is noted that while motor 28 is illustratively shown in FIGS. 1-9 as a part of an angle grinder, motor 28 may be alternatively used in any power tool or any other device or apparatus.

In an embodiment, rotor assembly 72 includes a rotor shaft 74, a rotor lamination stack 76 mounted on and rotatably attached to the rotor shaft 74, a rear bearing 78 arranged to axially secure the rotor shaft 74 to the motor housing 29, a sense magnet ring 324 attached to a distal end of the rotor shaft 74, and fan 37 also mounted on and rotatably attached to the rotor shaft 74. In various implementations, the rotor lamination stack 76 can include a series of flat laminations attached together via, for example, an interlock mechanical, an adhesive, an overmold, etc., that house or hold two or more permanent magnets (PMs) therein. The permanent magnets may be surface mounted on the outer surface of the lamination stack 76 or housed therein. The permanent magnets may be, for example, a set of four PMs that magnetically engage with the stator assembly 70 during operation. Adjacent PMs have opposite polarities such that the four PMs have, for example, an N-S-N-S polar arrangement. The rotor shaft 74 is securely fixed inside the rotor lamination stack 76. Rear bearing 78 provide longitudinal support for the rotor 74 in a bearing pocket (described later) of the motor housing 29.

In an embodiment, fan 37 of the rotor assembly 72 includes a back plate 60 having a first side 62 facing the field case 16 and a second side 64 facing the gear case 14. A plurality of blades 66 extend axially outwardly from first side 62 of the back plate 60. Blades 64 rotate with the rotor shaft 44 to generate an air flow as previously discussed. When motor 28 is fully assembled, fan 37 is located at or outside an open end of the motor housing 28 with a baffle 330 arranged between the stator assembly 70 and the fan 37. The baffle 330 guides the flow of air from the blades 64 towards the exhaust vents 58.

Figure 7:
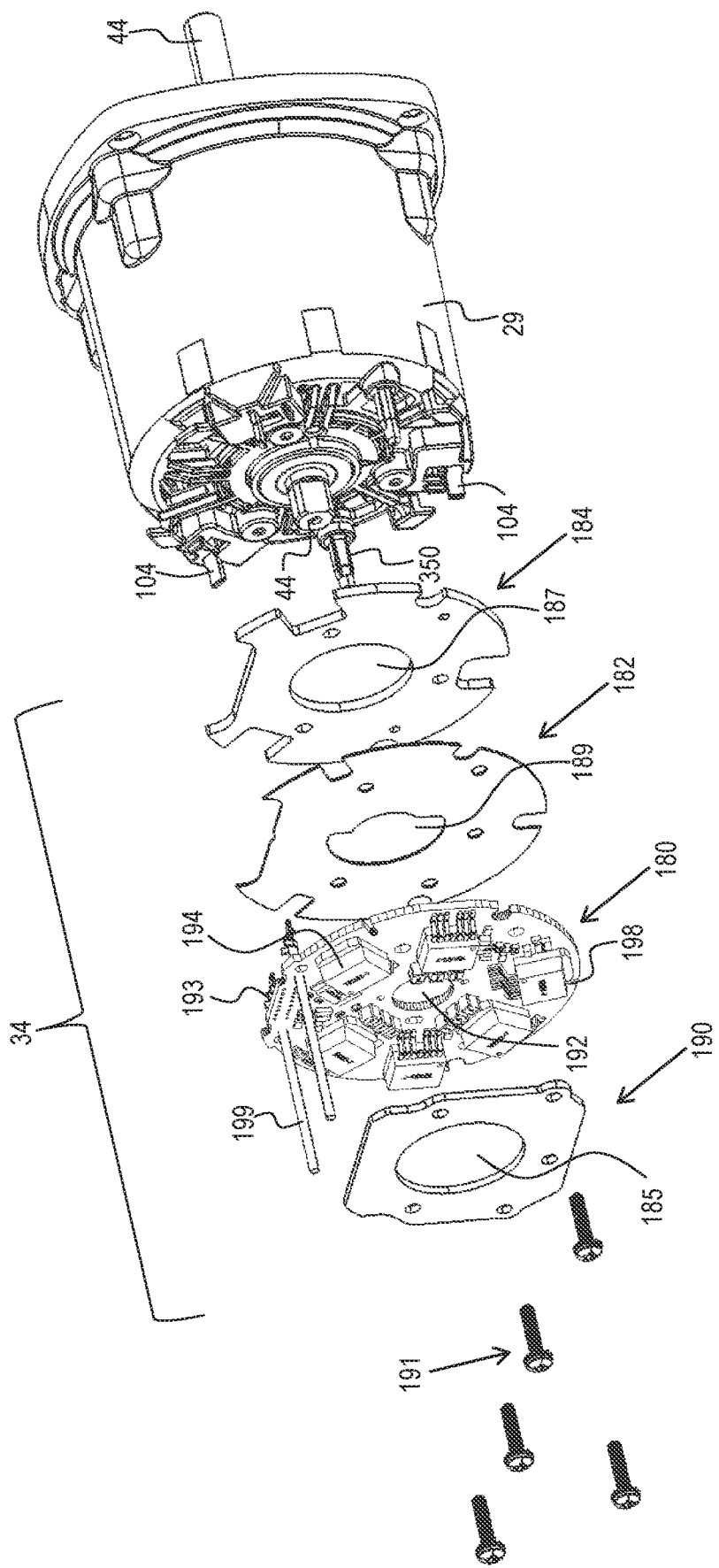
FIG. 7 depicts an exploded view of a power module disposed adjacent the motor, according to an embodiment of the invention.

FIG. 7 depict exploded views of the power module 34 adjacent the motor 28, according to an embodiment. As shown herein, in an embodiment, power module 34 includes a power board 180, a thermal interface 182, and a heat sink 184 which attach to the rear end of the motor housing 29 via fasteners 191. Power module 34 may be further provided with a clamp ring 190 that acts to clamp and cover the power board 180 and act as a secondary heat sink. Power module 34 may be disc-shaped to match the cylindrical profile of the motor 28. Additionally, power module 34 may define a center through-hole 192 that extends through the power board 180 to accommodate the rotor shaft 44 in some embodiments. In an embodiment, through-holes 185, 187, and 189 similarly extend through the clamp ring 190, thermal interface 182, and heat sink 184, as further described later.

In an embodiment, power board 180 is a generally disc-shaped printed circuit board (PCB) with six power transistors 194, such as MOSFETs and/or IGTBs, that power the stator windings 86 of the motor 28, on a first surface thereof. Power board 180 may additionally include other circuitry such as the gate drivers, bootstrap circuit, and all other components needed to drive the MOSFETs and/or IGTBs. In addition, power board 180 includes a series of positional sensors (e.g., Hall sensors, not shown) on a second surface thereof opposite the first surface, as explained later in detail.

In an embodiment, power board 180 is electrically coupled to a power source (e.g., a battery pack) via power lines 199 for supplying electric power to the transistors 194. Power board 180 is also electrically coupled to a controller (e.g., inside control unit 11 in FIG. 2) via control terminal 193 to receive control signals for controlling the switching operation of the transistors 194, as well as provide positional signals from the positional sensors 322 to the controller. The transistors 194 may be configured, for example, as a three-phase bridge driver circuit including three high-side and three low-side transistors connected to drive the three phases of the motor 28, with the gates of the transistors 194 being driven by the control signals from the control terminal 193. Examples of such a circuit may be found in US Patent Publication No. 2013/0342144, which is incorporated herein by reference in its entirety. In an embodiment, power board 180 includes slots 198 for receiving and electrically connecting to the input terminals 104. In an embodiment, slots 198 may be defined and spread around an outer periphery of the power board 180. The outputs of the transistors bridge driver circuit is coupled to the motor 28 phases via these input terminals 104.

Figure 8:
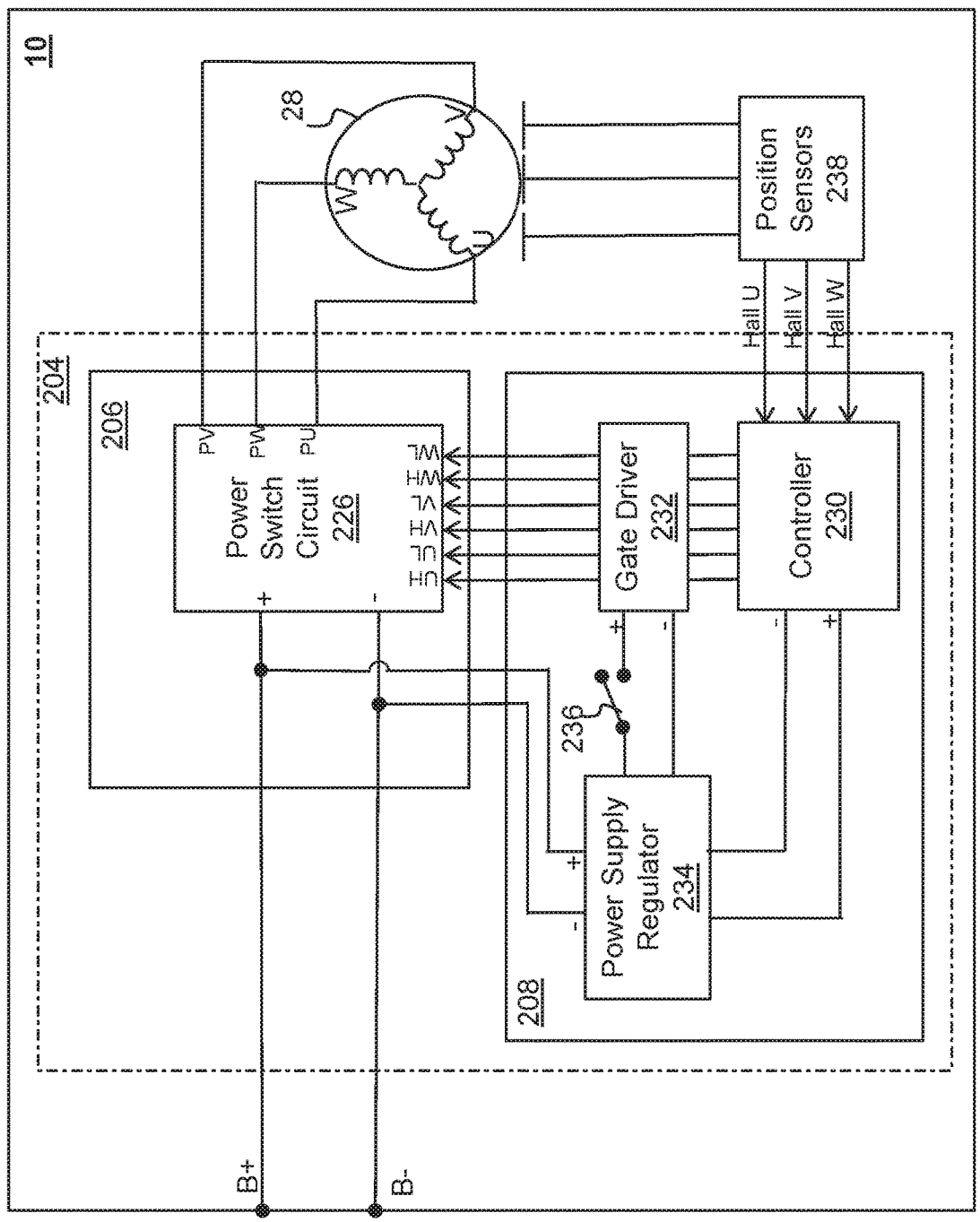
FIG. 8 depicts an exemplary circuit block diagram of a cordless power tool including a motor control circuit, according to an embodiment.

Referring to FIG. 8, a circuit block diagram of power tool 10 including a motor 28 and a motor control circuit 204 is depicted, according to an embodiment. In an embodiment, motor control circuit 204 includes a power unit 206 and a control unit 208. In FIG. 8, power tool 10 received DC power from a DC power source such as a battery pack via B+ and B− terminals.

In an embodiment, power unit 206 may include a power switch circuit 226 coupled between the power source B+/B− terminals and motor windings to drive BLDC motor 28. In an embodiment, power switch circuit 226 may be a three-phase bridge driver circuit including six controllable semiconductor power devices (e.g. FETs, BJTs, IGBTs, etc.), such as power devices 198 shown in FIG. 7.

In an embodiment, control unit 208 may include a controller 230, a gate driver 232, a power supply regulator 234, and a power contact switch 236. In an embodiment, controller 230 is a programmable device arranged to control a switching operation of the power devices in power switching circuit 226. In an embodiment, controller 230 receives rotor rotational position signals from a set of position sensors 238 provided in close proximity to the motor 28 rotor. In an embodiment, position sensors 238 may be Hall sensors. It should be noted, however, that other types of positional sensors may be alternatively utilized. It should also be noted that controller 230 may be configured to calculate or detect rotational positional information relating to the motor 28 rotor without any positional sensors (in what is known in the art as sensorless brushless motor control). Controller 230 may also receive a variable-speed signal from variable-speed actuator or a speed-dial. Based on the rotor rotational position signals from the position sensors 238 and the variable-speed signal, controller 230 outputs drive signals UH, VH, WH, UL, VL, and WL through the gate driver 232, which provides a voltage level needed to drive the gates of the semiconductor switches within the power switch circuit 226 in order to control a PWM switching operation of the power switch circuit 226.

In an embodiment, power supply regulator 234 may include one or more voltage regulators to step down the power supply to a voltage level compatible for operating the controller 230 and/or the gate driver 232. In an embodiment, power supply regulator 234 may include a buck converter and/or a linear regulator to reduce the power voltage of power supply interface 128-5 down to, for example, 15V for powering the gate driver 232, and down to, for example, 3.2V for powering the controller 230.

In an embodiment, power contact switch 236 may be provided between the power supply regulator 234 and the gate driver 232. Power contact switch 236 may be an ON/OFF switch coupled to the ON/OFF trigger or the variable-speed actuator to allow the user to begin operating the motor 28, as discussed above. Power contact switch 236 in this embodiment disables supply of power to the motor 28 by cutting power to the gate drivers 232. It is noted, however, that power contact switch 236 may be provided at a different location. In an alternative embodiment, power contact switch 236 is provided within the power unit 206 between the battery terminal (B+ and/or B−) and the power switch circuit 226. It is further noted that in an embodiment, power tool 128 may be provided without an ON/OFF switch 236, and the controller 230 may be configured to activate the power devices in power switch circuit 226 when the ON/OFF trigger (or variable-speed actuator) is actuated by the user.

Figure 9:
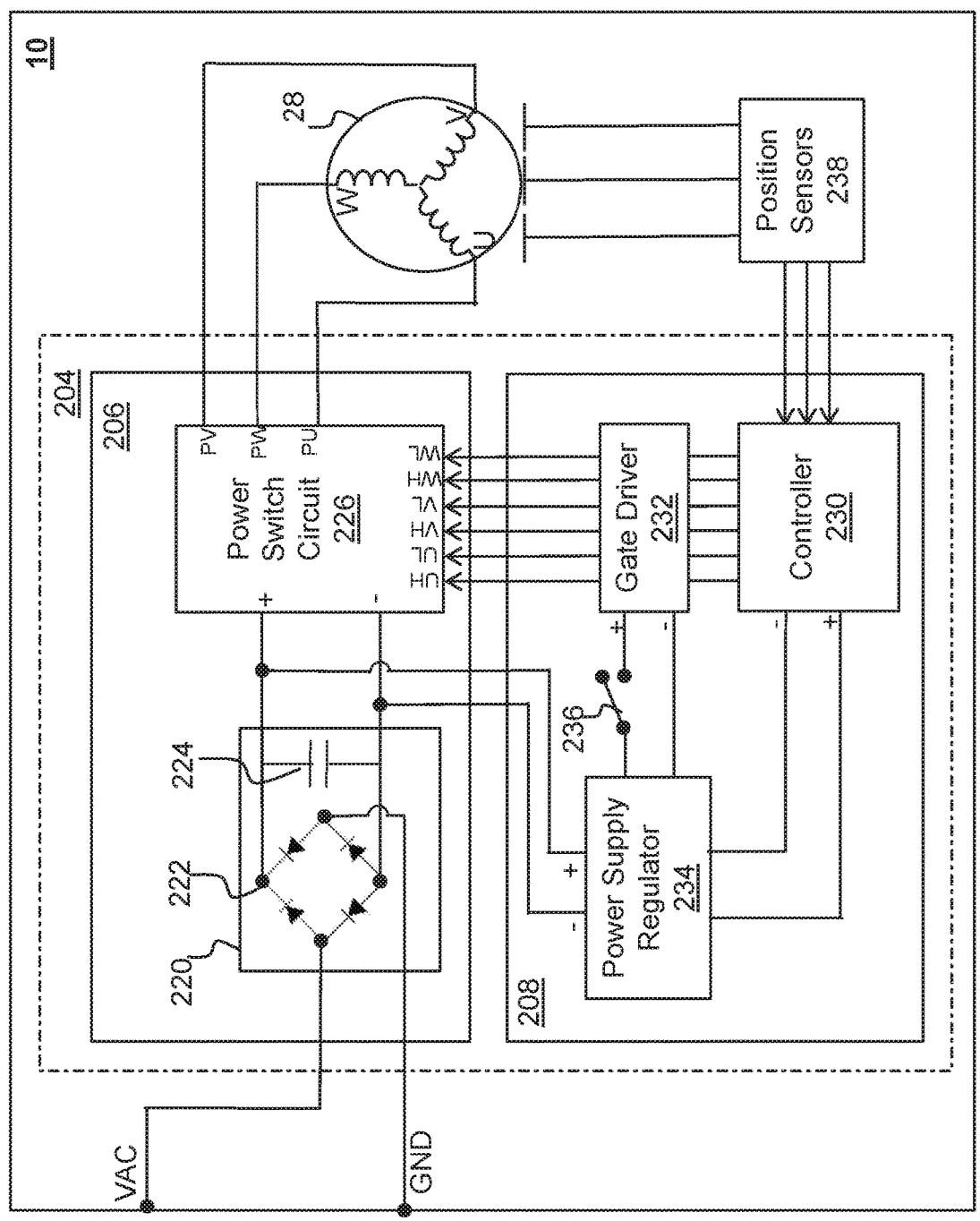
FIG. 9 depicts an exemplary circuit block diagram of a corded power tool including a motor control circuit, according to an embodiment.

FIG. 9 depicts a block circuit diagram of power tool 10 that received powers from an AC power supply such as, for example, an AC power generator or the power grid. As the name implies, BLDC motors are designed to work with DC power. Thus, in an embodiment, power unit 206 is provided with a rectifier circuit 220 between the power supply and the power switch circuit 226. In an embodiment, power from the AC power lines as designated by VAC and GND is passed through the rectifier circuit 220 to convert or remove the negative half-cycles of the AC power. In an embodiment, rectifier circuit 220 may include a full-wave bridge diode rectifier 222 to convert the negative half-cycles of the AC power to positive half-cycles. Alternatively, in an embodiment, rectifier circuit 220 may include a half-wave rectifier to eliminate the half-cycles of the AC power. In an embodiment, rectifier circuit 220 may further include a bus capacitor 224. In another embodiment, active rectification may be employed, e.g., for active power factor correction. In an embodiment, bus capacitor 224 may have a relatively small value to reduce voltage high-frequency transients on the AC power supply.

Figure 10:
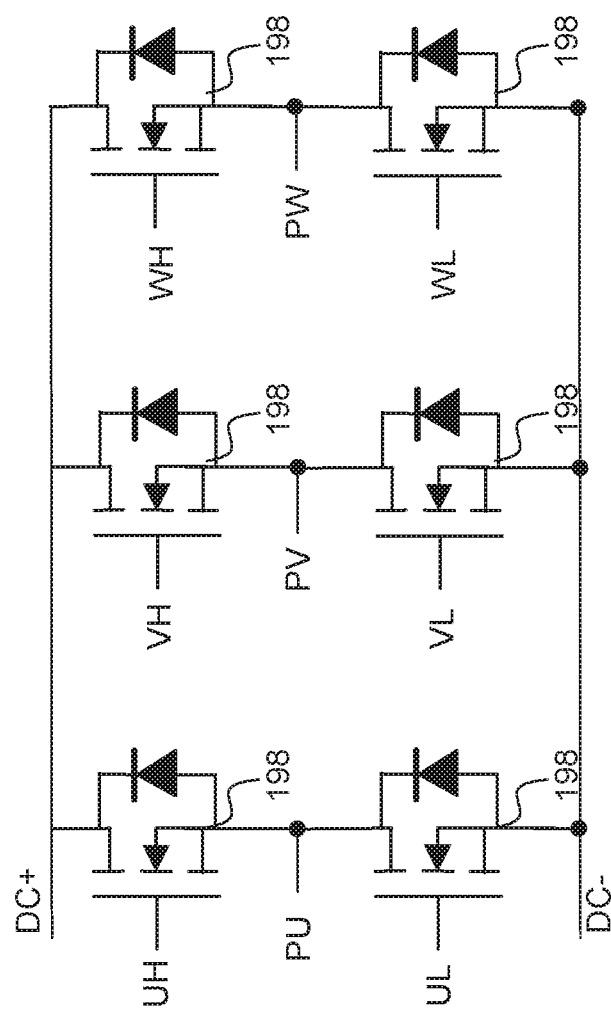
FIG. 10 depicts an exemplary circuit diagram of an three-phase inverter circuit for driving a BLDC motor, according to an embodiment.

FIG. 10 depicts an exemplary power switch circuit 226 having a three-phase inverter bridge circuit, according to an embodiment. As shown herein, the three-phase inverter bridge circuit includes three high-side FETs and three low-side FETs. The gates of the high-side FETs driven via drive signals UH, VH, and WH, and the gates of the low-side FETs are driven via drive signals UL, VL, and WL. In an embodiment, the drains of the high-side FETs are coupled to the sources of the low-side FETs to output power signals PU, PV, and PW for driving the BLDC motor 28.

Figure 11:
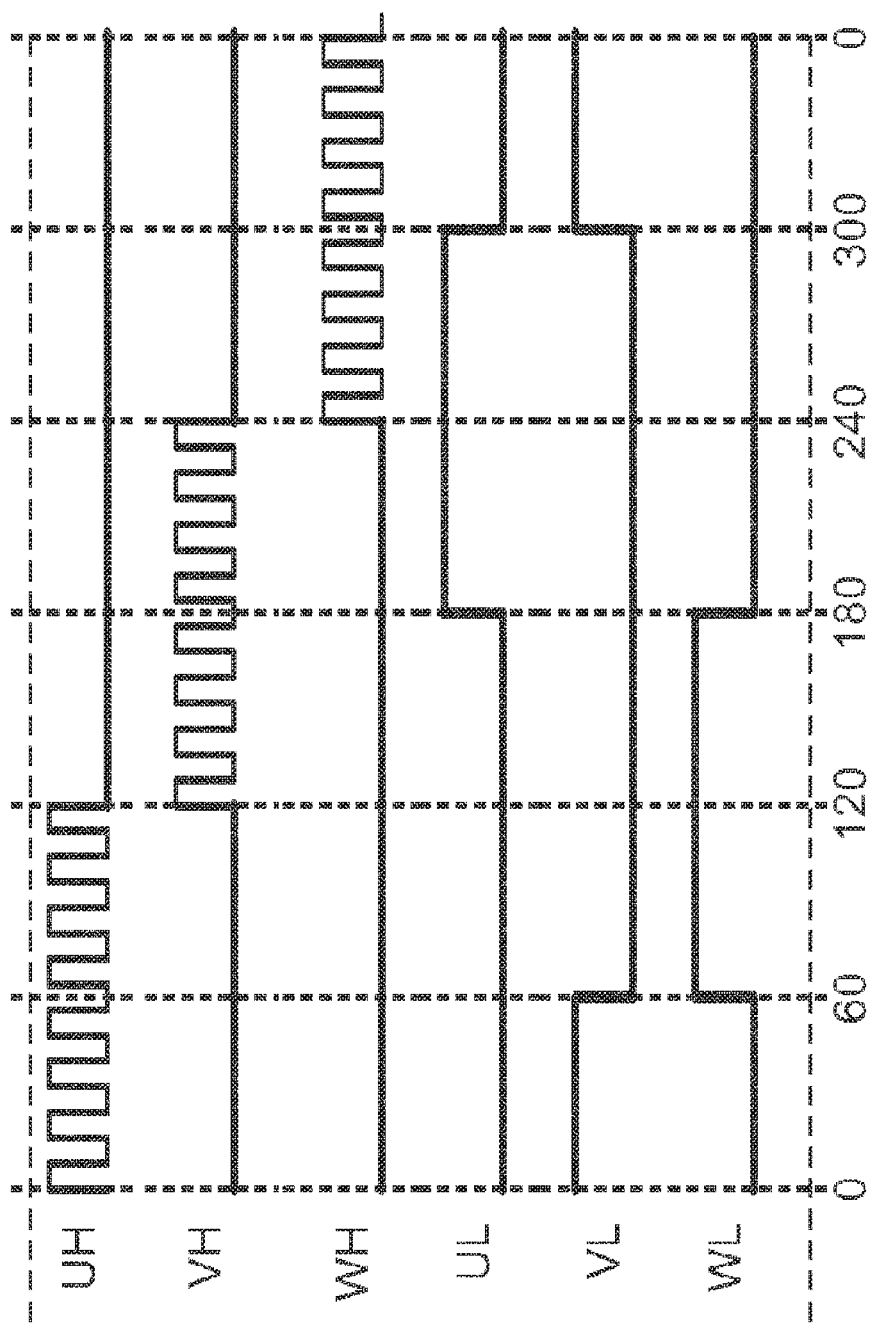
FIG. 11 depicts an exemplary waveform diagram of a pulse-width modulation (PWM) drive sequence of the three-phase inventor bridge circuit of FIG. 10 within a full 360 degree conduction cycle, according to an embodiment.

FIG. 11 depicts an exemplary waveform diagram of a pulse-width modulation (PWM) drive sequence of the three-phase inventor bridge circuit of FIG. 10 within a full 360 degree conduction cycle. As shown in this figure, within a full 360° cycle, each of the drive signals associated with the high-side and low-side power switches is activated during a 120° conduction band ("CB"). In this manner, each associated phase of the BLDC 202 motor is energized within a 120° CB by a pulse-width modulated voltage waveform that is controlled by the control unit 208 as a function of the desired motor 28 rotational speed. For each phase, the high-side switch is pulse-width modulated by the control unit 208 within a 120° CB. During the CB of the high-side switch, the corresponding low-side switch is kept low, but one of the other low-side switches is kept high to provide a current path between the power supply and the motor windings. The control unit 208 controls the amount of voltage provided to the motor, and thus the speed of the motor, via PWM control of the high-side switches.

It is noted that while the waveform diagram of FIG. 11 depicts one exemplary PWM technique at 120° CB, other PWM methods may also be utilized. One such example is PWM control with synchronous rectification, in which the high-side and low-side switch drive signals (e.g., UH and UL) of each phase are PWM-controlled with synchronous rectification within the same 120° CB.

Figure 12:
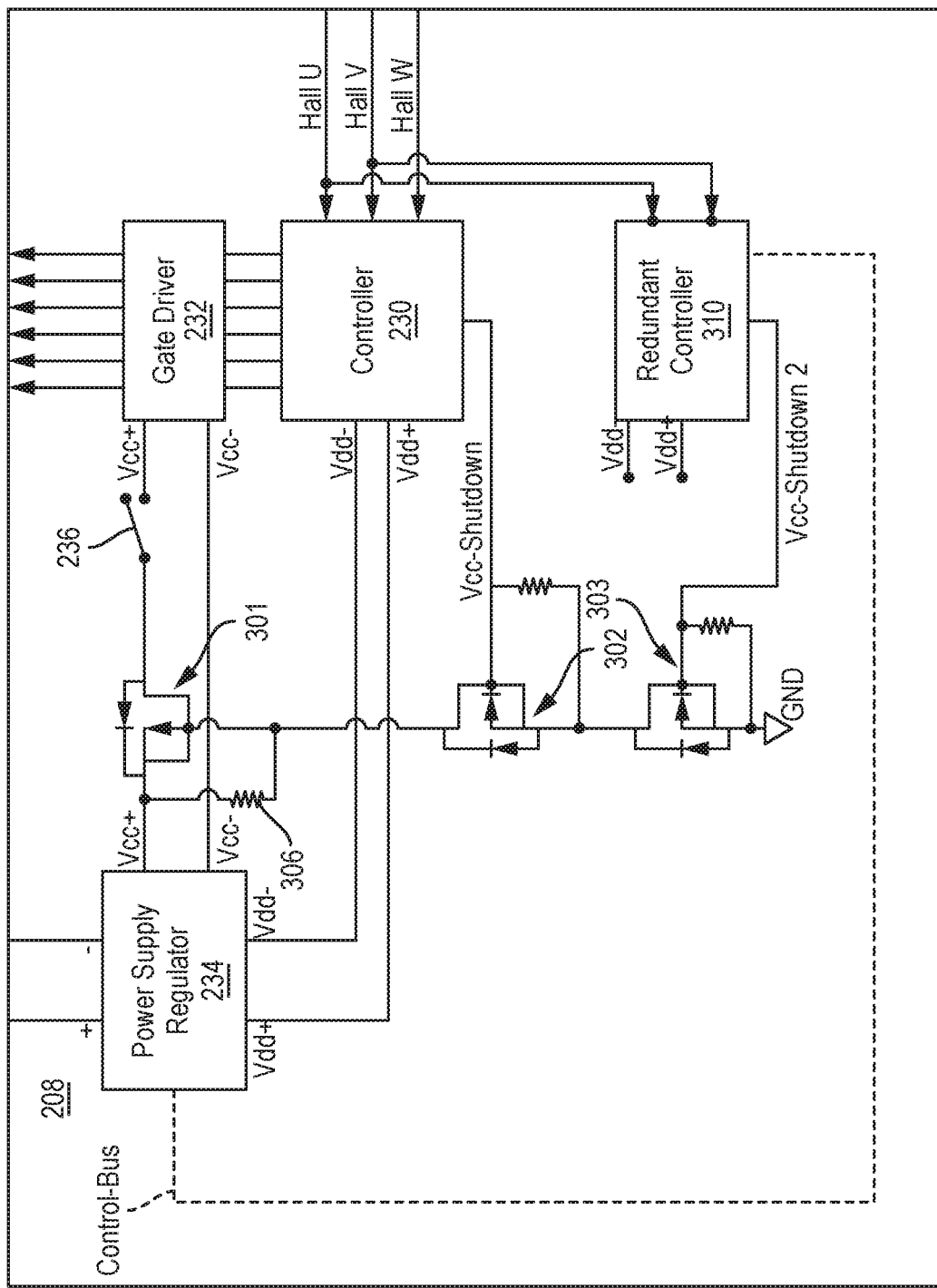
FIG. 12 depicts a control unit for operating a BLDC motor, according to an additional and/or alternative embodiment of the invention.

One aspect of the invention is described herein with reference to FIG. 12.

FIG. 12 depicts control unit 208 of FIGS. 8 and 9 according to an additional and/or alternative embodiment of the invention. As shown here, the control unit 208 is provided, in addition or in place of power contact switch 236, with a main solid-state switch 301 on the path of the Vcc power line from the power supply regulator 234 to the gate drivers 232. Main switch 301 in this embodiment is a MOSFET, though it must be understood that the main switch 301 may alternatively be an IGBT or any other solid-state switch capable of carrying sufficient current to power the gate driver circuit 232. In this embodiment, main switch 301 is a P-type switch. It must also be understood that main switch 301 may be alternatively disposed at other locations within the power tool to cut off power from the power supply to the motor, e.g., between the power supply regulator 234 and the controller 230.

In an embodiment, the gate of main switch 301 is controlled by the controller 230 via a secondary sold-state switch 302. Secondary switch 302 is disposed between a ground signal (Gnd) and the gate of the main switch 301 and its gate is controlled via the controller 230. The gate of the main switch 301 is also coupled to the Vcc signal through resistor 306. Under normal operating conditions, the gate of main switch 301 is driven via the Gnd signal and kept ON. The resistor 306 allows for the Gnd signal to trump the Vcc signal and activate the main switch 301. When a condition occurs that prompts the controller 230 to shut power to the motor, the controller 230 deactivates the gate of the secondary switch 302 via the VCC_SHUTDOWN signal, which is an active-high signal. This in turn decouples the gate of the main switch 301 from Gnd. The Vcc signal drives the gate of the main switch high, which turns off the main switch 301 and cuts off power from the power supply regulator 234 to the gate driver 232. Such a condition may include, but is not limited to, trigger release by the user, a battery fault condition (e.g., over-current, over temperature, under-voltage), a tool fault condition (e.g., over-temperature, over-current, stall, etc.), or a motor fault condition (e.g., over-speed, or incorrect rotation of the motor). The controller 230 may receive a fault signal from the battery pack (not shown) and initiate shut-down accordingly when a battery fault condition occurs. Additionally and/or alternatively, the controller 230 may monitor various tool, motor, or battery operations and initiate shut-down on its own when it detects a fault condition, and initiates tool shutdown via the secondary switch 302.

As for motor fault conditions, in an embodiment, the controller 230 may use the hall signals Hall U, Hall V, and Hall W signals to determine the rotational output speed and the direction of rotation of the motor. In the event the motor is rotating beyond a prescribed threshold speed (e.g., 30 k rpm for a grinder application), or in an incorrect direction, the controller 230 may determine that there is a motor fault condition. Upon detection of a motor fault condition, the controller 230 initiates tool shut-down via the secondary switch 302.

According to an embodiment, the primary controller 230 may fail at times for various electro-mechanical or software reasons. Such failures may include software bugs, contaminated routing and/or wiring, or a faulty micro-controller chip. It is thus important to protect users in the event of a controller 230 failure, particularly from motor failures that can physically harm the user.

Accordingly, in an embodiment of the invention, an additional redundant controller 310 may be provided. Redundant controller 310 may be, for example, a low cost, 8-bit micro-controller (such as a PIC10F200 Microchip®) that is substantially smaller in size and more inexpensive than the main controller 230. In an embodiment, redundant controller 310 includes, in addition to power terminals Vdd+ and Vdd−, two input terminals that receive two of the hall signals (in this case Hall U and Hall V signals) and an output terminal that outputs a VCC_Shutdown_2 signal. VCC_Shutdown_2 signal is an active-high signal coupled to a gate of a third solid-state switch 303, disposed in series with the secondary switch 302, as shown in FIG. 12. The redundant controller 310 determines the speed and rotational direction of the motor based on the two hall signals. If the detected speed (as determined by the time gap between the hall signals) exceeds a pre-programmed threshold, or if the sequence of the signals is opposite a pre-programmed direction indicative of an incorrect rotational direction of the motor, the redundant controller 230 deactivates the third switch 303 by disabling the VCC_Shutdown_2 signal, which in turn turns off the main switch 301. This arrangement allows either the main controller 230 or the redundant controller 310 to shut off power to the motor in the event of a motor over-speed or incorrect rotation.

In this embodiment, the rotational direction of the motor is pre-programmed into the redundant controller. Such an arrangement is suitable for uni-directional tools such as a grinder. Alternatively, a redundant controller 230 may receive a desired rotation signal (e.g., from a forward-reverse bar in a drill or an impact driver) and compare the detected rotation to the desired rotation to determine if the motor is rotating in the correct direction.

Also, in this embodiment, the controller 230 and redundant controller 310 monitor the rotational speed and/or direction of the motor 28 via Hall signals Hall_U, Hall_V, and Hall_W received from positional sensors 238. It must be understood, however, that the teachings of this disclosure may apply to a sensorless brushless motor system, and controller 230 and redundant controller 310 may determine the speed and/or direction of the motor 28 via any sensorless speed control means, e.g., by monitoring a back electro-magnetic force (back-EMF) voltage of the motor, vector-space control, etc.

Figure 13:
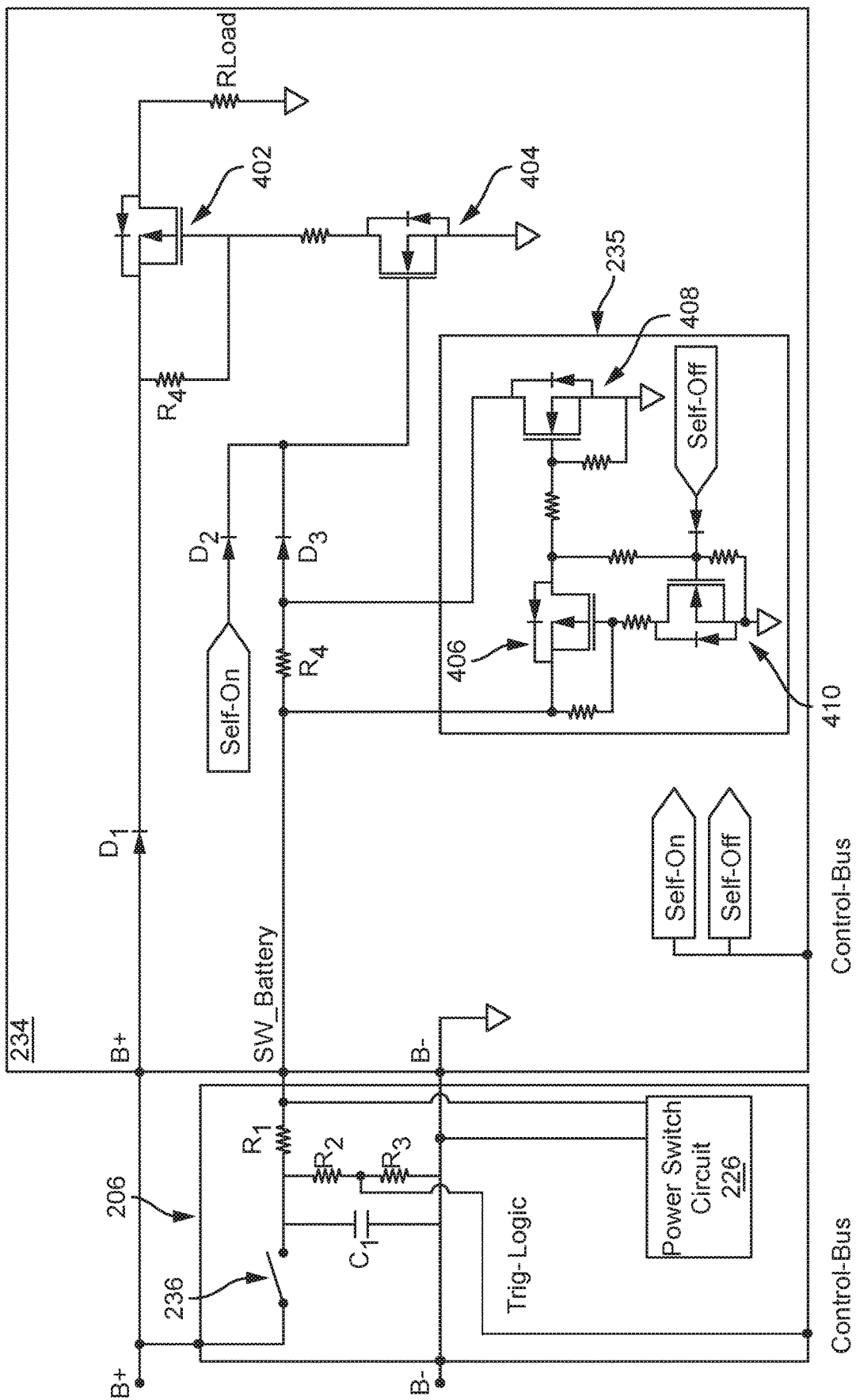
FIG. 13 depicts an exemplary circuit diagram of a power supply regulator including a leakage shutdown circuit, according to an embodiment.

Another aspect of the invention is described herein with reference to FIG. 13 and with continued reference to FIG. 8.

Many of today's cordless power tools use lithium-ion battery packs to power the motor. An inherent characteristic of lithium-ion battery cells is that they cannot recover or be recharged for reuse once they are discharged below a minimum voltage threshold. For that reason, power tools and/or battery pack controls typically include a discharge control mechanism to ensure that the lithium-ion cells of the battery pack are not over-discharged. Such a discharge control typically monitors the state of charge (e.g., cell voltage) of the battery pack cells and shut off power supply from the battery pack in the event that the state of charge is below the minimum voltage threshold.

A problem arises when a battery pack is plugged into the power tool and the power tool is in a "stuck trigger" condition. This condition occurs when the tool trigger is inadvertently depressed (e.g., when placed against an object in a tool bag). Actuation of the trigger switch creates a path for leakage current to discharge from the battery pack even when the tool is not in use. This leakage current continues to power the controller 230, and although the leakage current is relatively small, it can over-discharge the battery pack. The controller 230 is unable to disable the battery pack even when a battery under-voltage condition is detected. A mechanism is needed to ensure that this "stuck trigger' condition does not over-discharge the battery pack.

For example, in FIG. 8, in a "stuck trigger" condition, power contact switch 236 continues to power the controller 230 through the power supply regulator 234, creating a leakage path for the battery pack. As previously described, the power contact switch 236 may be disposed between power supply regulator 234 and the gate driver 232 and/or the controller 230. Alternatively, the power contact switch 236 may be disposed between the battery terminal (B+ and/or B−) and the power switch circuit 226. This embodiment is described, by way of example, with respect to the latter arrangement of the power contact switch 236.

In order to ensure that inadvertent trigger depression does not over-discharge the battery pack, in an embodiment of the invention, power supply regulator 234 circuit, as described with reference to FIG. 8, is additionally provided with a leakage shutdown circuit 235, described herein with reference to FIG. 13.

In an embodiment, the power supply regulator 234 includes one or more voltage regulators (not shown) arranged to step down the voltage of the power supply to produce the Vcc and Vdd voltage signals, which are suitable for operating the controller 230 and/or the gate driver 232. Resistor R-Load in this circuit represents the load asserted by the voltage regulators.

In an embodiment, the power supply regulator 234 includes B+ and B− terminals coupled respectively to the B+ and B− nodes of the battery pack. Power supply regulator 234 also includes a solid-state load switch 402 provided between the B+ terminal and R-Load. When the load switch 402 is off, the B+ terminal is cut off from the load R-Load, thus minimizing the leakage current being discharged from the battery pack.

In an embodiment, the power supply regulator 234 also includes a SW_Battery terminal, which is connected to the output of power contact switch 236. In other words, power contact switch 236 is disposed on the current path from the battery terminal B+ to both the power supply regulator 234 and the power switch circuit 226. The power contact switch 236 closes when the trigger switch (e.g., trigger 32 in FIG. 1) is actuated.

In an embodiment, an input voltage signal from the SW_Battery terminal is coupled to a gate of a control switch 404, which is in turn coupled to the gate of load switch 402. When the battery pack is plugged into the tool 10 and the tool trigger switch 32 is actuated, the input voltage signal through the SW_Battery terminal activates the control switch 404. Activation of the control switch 404 grounds the gate of the load switch 402, which in this embodiment is a P-type solid state switch and is turned on when its gate is grounded. This occurrence connects R-Load to the B+ terminal through diode D1, thus supplying power form the battery pack to the load R-Load.

This connection powers up the controller 230. In an embodiment, the controller 230 is in turn configured to initiate a self-activating feedback signal Self_ON upon being powered ON. The Self_ON signal continues to keep the control switch 404, and thus the load switch 401, ON for as long as the controller 230 desires.

In an embodiment, controller 230 can also read the status of the trigger switch (i.e., switch 420 and/or signal SW_Battery) through a logic signal (herein represented by Trig_Logic). In an embodiment, the Trig_Logic signal is coupled in parallel with the C1 capacitor, across the B− terminal and the output of the power contact switch 236, within power unit 206. Trigger_Logic signal is coupled to a node between resistors R2 and R3 disposed in series across the B-terminal and the output of the power contact switch 236. R2 and R3 resistors are sized to produce a suitable voltage logic signal on the Trig_Logic signal when power contact switch 236 is closed.

In an embodiment, if the Trig-Logic signal is high for an extended period of time (e.g., longer than 5 minutes), the controller 230 may determine a "stuck trigger" condition, i.e., that the trigger 32 has been left depressed inadvertently. Absent the leakage shutdown circuit 235 described in detail herein, the controller 230 in unable to deactivate the load switch 402 to cut off supply of power to R-Load, and the controller 230 and/or gate driver 232 continue to place a load on the battery pack.

To enable the controller 230 to shut down the load switch 402 while the trigger switch 32 is still depressed, in an embodiment, the leakage shutdown circuit 235 is provided on the current path from the SW_Battery terminal to gate of switch 404. The leakage shutdown circuit 235 is activated via a self-deactivating Self_OFF signal from the controller 230, and is operable to cut off the voltage signal from the SW_Battery terminal.

In an embodiment, the leakage shutdown circuit 235 is provided with a logic-state override switch 408. In an embodiment, override switch 408 is disposed between the SW_Battery and B− terminals, and is coupled together with the SW_Battery terminal to the gate of the control switch 404. During normal operation, the override switch 408 is kept OFF. When switch 408 is turned ON, it overrides the SW_Battery terminal signal through resister R4 and grounds the gate of control switch 404, which in turn disables load switch 402.

In an embodiment, when the controller 230 determines a "stuck trigger" condition, it initiates tool shutdown by deactivating the Self_ON signal and simultaneously activating the Self_OFF signal. The Self_OFF signal is coupled to the gate of the override switch 408, and thus disables the control switch 404, and subsequently load switch 402, once the controller 230 determines a "struck trigger" condition.

Once the load switch 402 is turned OFF, it cuts power to the controller 230. The Self_OFF signal can therefore be active for a very short period of time. In order to prevent the SW_Battery terminal from reactivating the control switch 404 and load switch 402 after the controller 230 loses power, the leakage shutdown circuit 235 is provided with a latch circuit including a first switch 410 and a second switch 406. In an embodiment, the Self_OFF signal turns ON third switch 410, which is disposed between the B− node and the gate of the second switch 406. The second switch 406 is a P-type switch, and is therefore activated when the Self_OFF signal is high. The second switch 406 in turn couples the SW_Battery terminal to the gate of override switch 408 to keep override switch 408 ON. The B+ power through the SW_Battery terminal continues to keep override switch 408 ON even after the controller 230 loses power and the Self_OFF signal is disabled. The battery B+ power line is also coupled to the gate of first switch 410 to create a latching circuit for the gate of override switch 408 even after the Self_OFF signal is disabled. In an embodiment, this latching mechanism continues to keep switch 408 ON as long as the "stuck trigger" condition persists.

Figure 14:
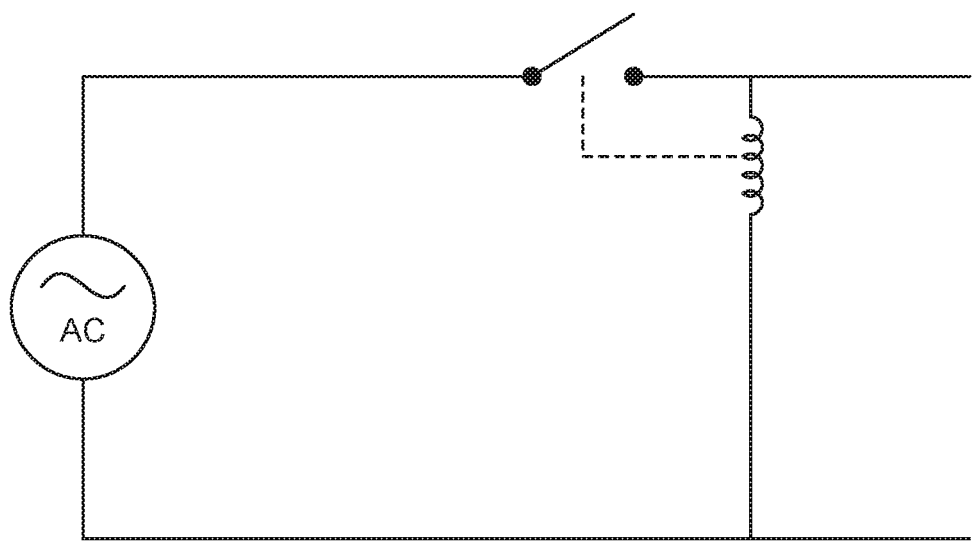
FIG. 14 depicts a circuit diagram showing a solenoid switch used in a conventional corded power tool.
Figure 15:
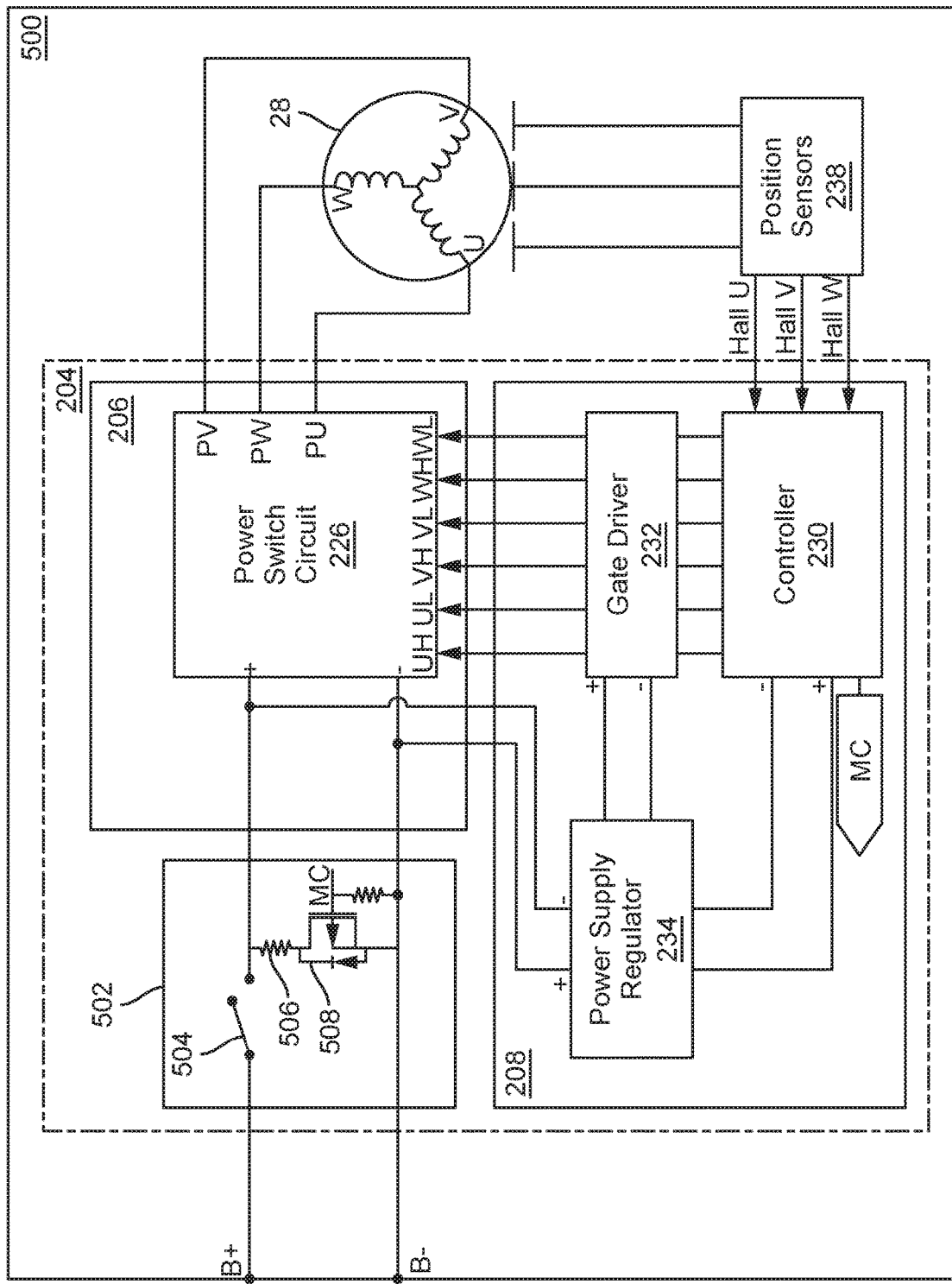
FIG. 15 depicts an exemplary circuit diagram of a cordless power tool including a controllable solenoid switch, according to an embodiment.

Another aspect of the invention is described herein with reference to FIGS. 14 and 15.

Use of a solenoid switch for AC power tools is well known. A solenoid switch, as shown in FIG. 14, is made up on a spring-loaded power contact switch, and a solenoid. When the user presses the power tool ON/OFF switch against the force of the spring, it closes the switch. The solenoid is then energized via the electric power from the AC power source, which then asserts a magnetic force on the contact switch to keep the contact switch closed against the force of the spring.

A solenoid switch is typically used in AC power tools as a "no-volt" protection mechanism. A "no-volt" condition refers to a situation where the tool is plugged in while the power switch is in the ON position, which starts the motor immediately after the user has plugged it in. This is dangerous to the user and the work environment. By using a solenoid switch in place of a regular ON/OFF switch, the load of the spring pops the switch every time AC power is cut off from the tool. Thus, a no-volt condition is avoided the next time the tool is plugged into an AC power source.

PCT Application Publication No. WO 2015/179318 filed May 18, 2015 describes various high power cordless DC and AC/DC power tools, such as 60V or 120V power tools employing one or more 60V DC battery packs. These may include fixed-seed power tools such as cordless table saws, compressors, etc. that are conventionally corded AC tools. Instead of a trigger switch, such tools are typically provided with a current-carrying mechanical ON/OFF power switch that cuts off power from the power supply to the motor. The "no-volt" condition describes may be an issue in such tools where, for example, the battery pack (or battery packs) are inserted into the tool while the power switch is in the ON position. In addition, such tools should provide the controller the ability to shut the tool down in the event of detection of a battery pack, tool, or motor fault condition previously described.

Thus, according to an embodiment of the invention, as shown in the block diagram 500 of FIG. 15 for a high power DC cordless power tool, a switching arrangement 502 is provided on the DC bus line between the battery terminals B+/B− and the power switch circuit 226. In an embodiment, the switching arrangement includes a solenoid switch having a spring-loaded contact ON/OFF power switch 504 and a solenoid 506. When the user presses the ON/OFF power switch against the force of the spring, it closes the switch, which couples the power source to the tool circuitry. The solenoid 506, which is arranged across the B+ and B− terminals, is then energized and asserts a magnetic force on the power switch 504 to keep the power switch closed against the force of the spring. By using a solenoid switch in place of a regular ON/OFF switch, the load of the spring pops the power switch 504 every time the battery pack is removed from the power tool, regardless of whether the user indeed turns off the power switch 504. Thus, a no-volt condition is avoided the next time another battery pack is inserted into the tool battery receptacle.

Additionally, according to an embodiment, a solid-state semiconductor switch 508 is provided in series with the solenoid 506 across the B+ and B− terminals. The semiconductor switch 508 is controllable by the controller 230 via a control signal MC. The controller 230 may deactivate the switch 508 via the MC signal upon detection of a fault condition. Such conditions may include, but are not limited to, a battery fault (e.g., over-current, over temperature, under-voltage) condition, a tool fault (e.g., over-temperature, over-current, stall, etc.) condition, or a motor fault (e.g., over-speed, or incorrect rotation) condition. When switch 508 is deactivated by the controller 230, it cuts off the solenoid 506 from the power supply, which in turn pops the power switch 504. Thus, in addition to no-volt protection by the solenoid switch, the controller 230 can also de-energize the solenoid to shut off the power switch 504 upon detection of any fault condition.

Figure 16:
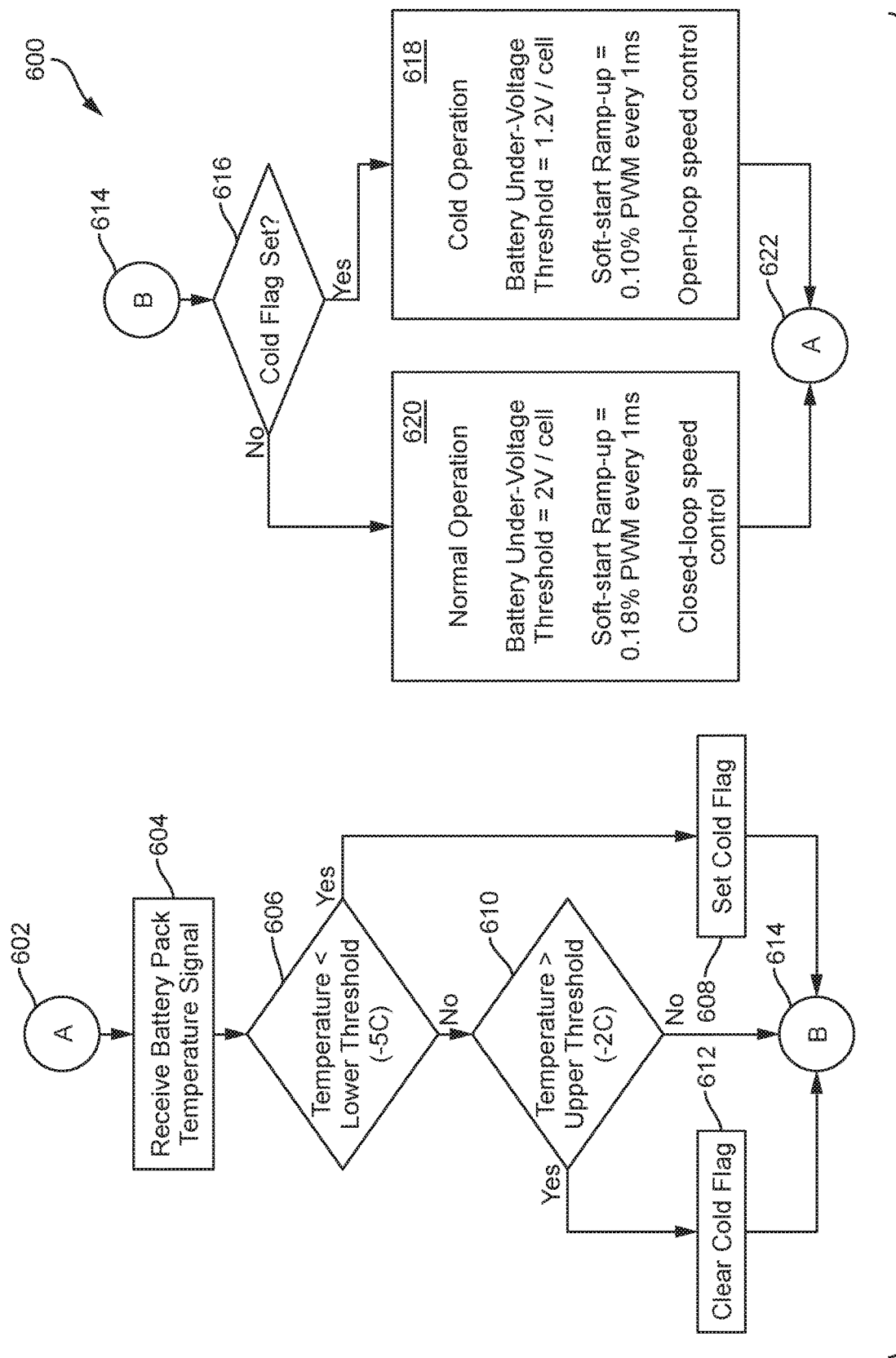
FIG. 16 depicts an exemplary flow diagram for controlling a cold operation and normal operation of the power tool, according to an embodiment.

Another aspect of the invention is described herein with reference to FIG. 16.

In a DC power tool operated via a battery pack, proper management of the temperature of the battery pack is important. While high battery temperature may damage the cells and presents a fire hazard, low battery temperature increases the impedance of the battery cells. Such a condition causes the voltage of the cells to sag well below their nominal voltage by 50% at full charge and by up to 75% at a lower state of charge during tool start up.

During normal operation of the power tool, the controller 230 is configured to execute various tool and motor control algorithms that optimize the performance of the power tool.

For example, in an embodiment, during normal operation, the controller 230 may be configured to monitor the state of charge of the battery pack and shut off power from the battery pack in the event of a cell under voltage condition (e.g., when the battery cell voltage falls to less than 2V/cell).

In an embodiment, during normal operation, the controller 230 may also be configured to execute a "soft-start" algorithm, where the pulse-width modulation (PWM) duty cycle of the motor drive signals is gradually increased from zero to a target PWM (e.g., at a rate of 0.2% every 1 ms) until the motor rotational speed reaches a target speed set. This target speed may be set to a predetermined value for fixed-speed tools, or may be set in accordance to a trigger switch or a speed dial position for variable-speed tools.

In an embodiment, during normal operation, the controller 230 may also be configured to execute closed-loop speed control for the rotational speed of the motor. Closed-loop speed control refers to a speed control mechanism in which the rotational speed of the motor is set, not just based on trigger or speed dial position, but also based on the actual rotational speed of the motor. In an embodiment, the controller 230 may set a target speed based on the trigger or speed dial position, determine the actual rotational speed of the tool using the rotor positional sensors, and adjust motor speed so that the actual rotational speed of the motor matches the target speed. Thus, as load is applied to the tool, more power is supplied to the motor so as to maintain relatively constant output speed. In an embodiment, the controller 230 may do this by adjusting the PWM duty cycle. Additionally and/or alternatively, the controller 230 may adjust the conduction band and/or angle advance for each phase of the motor commutation.

When the battery pack is tool cold, the aforementioned battery management and tool control operations may require substantially more current that the battery pack can optimally handle due to the low impedance of the battery cells in cold temperatures. This adversely affects the life of the battery pack.

In order to optimize battery and motor performance while the battery pack is still cold, particularly during tool start up, according to an embodiment of the invention, the controller 230 is configured to perform certain battery management and tool control operations differently than during normal operation.

For example, in an embodiment, during "cold pack" mode of operation, the controller 230 may be configured to set a lower battery cell under-voltage threshold (e.g., 1.2V/cell rather than the normal 2V/cell). This prevents undesired battery shutdown while the battery pack is still cold.

Furthermore, in an embodiment, during cold pack operation, the controller 230 may be configured to set a soft-start ramp-up rate that is lower than the ramp-up rate during the normal mode of operation. For example, instead of increasing the PWM ramp-up at a rate of 0.2% every 1 ms, the controller 230 may increase the PWM ramp-up at a rate of 0.1% every 1 ms. This prevents heavy increases in current draw from the battery pack while it is still cold.

Furthermore, in an embodiment, during cold operation, the controller 230 may be configured to execute "open-loop" speed control, and initiate "closed-loop" control as described above during the normal mode of operation. In open-loop control, the controller sets a target PWM duty cycle in accordance with a trigger or speed dial position (for variable-speed tools), or based on a predetermined value (for fixed-speed tools), but does not use a feedback signal from the rotational speed of the motor to further adjust the motor commutation. This prevents heavy increases in current draw from the battery pack while it is still cold.

FIG. 16 depicts an exemplary flow diagram 600 for the controller 230 to execute "cold operation" and "normal operation" as described above. In an embodiment, in this process 600, which starts at A, step 602, the controller 230 receives a battery pack temperature signal from the battery pack at step 604. In an embodiment, this signal may be received directly from a thermistor within the battery pack. Then, at step 606, the controller 230 determines whether the pack temperature is lower than a lower temperature threshold (e.g., −5° C.). If yes, the controller 230 sets a cold flag at step 608. Otherwise, the controller 230 determines whether the pack temperature is above a higher temperature threshold (e.g., −2° C.). This hysteresis thresholding ensures that the controller 230 does not toggle between normal mode and cold pack mode when the battery pack temperature hovers around the threshold value. The controller 230 proceeds to B, at step 614, and determines whether the cold flag has been set at step 616. If the cold flag has been set, the controller enters the "cold operation" mode as described above, at step 618. Otherwise the controller 230 enters the normal mode of operation at step 620. The aforementioned process continues at step 622.

Some of the techniques described herein may be implemented by one or more computer programs executed by one or more processors residing, for example on a power tool. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A power tool comprising:
   a housing;
   an electric motor disposed within the housing and having a rotor;
   a power switch circuit disposed between a power supply and the electric motor;
   a plurality of positional sensors disposed in close proximity to the electric motor and output a plurality of position signals associated with a rotational position of the rotor;
   a main controller arranged to control a switching operation of the power switch circuit to regulate a speed of the motor, wherein the main controller is configured to calculate at least one of a speed or a rotational direction of the electric motor based on at least one of the plurality of position signals and deactivate the power switch circuit upon detection of fault condition associated the speed or the rotational direction of the electric motor;

a secondary controller configured to also calculate at least one of the speed or the rotational direction of the electric motor based on at least one of the plurality of position signals independently from the main controller and deactivate the power switch circuit upon detection of fault condition associated the speed or the rotational direction of the electric motor.

2. The power tool of claim 1, further comprising a main solid-state switch arranged to activate a supply of power to the electric motor.

3. The power tool of claim 2, further comprising a secondary solid-state switch activated via the main controller and coupled to a gate of the main solid-state switch.

4. The power tool of claim 3, further comprising a third solid-state switch activated via the secondary controller and coupled to the gate of the main solid-state switch in series with the secondary solid-state switch.

5. The power tool of claim 3, further comprising a gate driver circuit disposed between the main controller and the power switch circuit to drive the power switch circuit.

6. The power tool of claim 5, wherein the main solid-state switch is arranged between the power supply and the gate driver circuit.

7. The power tool of claim 6, further comprising a power supply regulator configured to produce a voltage power line for driving the gate driver circuit, wherein the main solid-state switch is arranged between the power supply regulator and the gate driver circuit.

8. The power tool of claim 3, wherein the main solid-state switch is a P-type semiconductor switch, and the secondary solid-state switch and the third solid-state switch are disposed between a ground terminal and the gate of the main solid-state switch.

9. The power tool of claim 8, further comprising a resistor disposed between a gate of the main solid-state switch and the power supply regulator to drive the gate of the main solid-state switch when at least one of the second solid-state switch or the third solid-state switch is deactivated.

10. The power tool of claim 1, wherein the electric motor is a three-phase brushless motor, and the plurality of position signals comprise three position signals corresponding to respective phases of the brushless motor.

11. The power tool of claim 10, wherein the secondary controller is configured to receive only two of the three position signals and determine the rotational direction of the electric motor based on the two position signals.

* * * * *